US009571312B2

(12) United States Patent
Brandt-Pearce et al.

(10) Patent No.: US 9,571,312 B2
(45) Date of Patent: Feb. 14, 2017

(54) EXPURGATED PULSE POSITION MODULATION FOR COMMUNICATION

(71) Applicants: Maite Brandt-Pearce, Free Union, VA (US); Mohammad Noshad, Charlottesville, VA (US)

(72) Inventors: Maite Brandt-Pearce, Free Union, VA (US); Mohammad Noshad, Charlottesville, VA (US)

(73) Assignee: University of Virginia Patent Foundation, Charlottesville, VA (US)

( * ) Notice: Subject to any disclaimer, the term of this patent is extended or adjusted under 35 U.S.C. 154(b) by 0 days.

(21) Appl. No.: 14/554,915

(22) Filed: Nov. 26, 2014

(65) Prior Publication Data

US 2015/0147069 A1 May 28, 2015

Related U.S. Application Data

(60) Provisional application No. 61/908,810, filed on Nov. 26, 2013.

(51) Int. Cl.
*H04L 25/49* (2006.01)
*H04B 10/116* (2013.01)
(Continued)

(52) U.S. Cl.
CPC ......... *H04L 25/4902* (2013.01); *H04B 10/116* (2013.01); *H04L 1/0071* (2013.01);
(Continued)

(58) Field of Classification Search
CPC .. H04B 10/116; H04L 25/4902; H04L 1/0071; H04L 1/0668; H04L 25/03006; H04L 2025/0335; H04L 2025/03789
See application file for complete search history.

(56) References Cited

U.S. PATENT DOCUMENTS 5,706,115 A * 1/1998 Hirayama .......... H04B 10/1149
341/68
5,926,301 A * 7/1999 Hirt ...................... H04B 14/026
375/239

(Continued)

FOREIGN PATENT DOCUMENTS

EP 2484029 A1 8/2012
WO WO-2013103698 A1 7/2013
(Continued)

OTHER PUBLICATIONS

Noshad, Mohammad; Brandt-Pearce, M., "Expurgated PPM Using Symmetric Balanced Incomplete Block Designs", Jul. 2012, IEEE Communications Letters, vol. 16, No. 7, pp. 968-971.*

(Continued)

*Primary Examiner* — Sophia Vlahos
(74) *Attorney, Agent, or Firm* — Schwegman Lundberg & Woessner, P.A.

(57) ABSTRACT

An expurgated pulse position modulation (EPPM) technique can be used to encode information for wireless transmission. Such an EPPM technique can be compatible with a simple receiver architecture, such as including a shift register and pulse position modulation (PPM) decoder. A multi-level EPPM (MEPPM) approach can increase the available symbols in the modulation constellation and can be used to accommodate multiple users or devices concurrently. Interleaving techniques can be used such as to reduce intersymbol interference. An optical transmitter and an optical receiver can be used, such as including using energy in a visible range of frequencies. In an example, an optical source such as including one or more light emitting diodes can provide visible light for illumination, and the EPPM technique can include using codewords specified to provide a desired dimming level when such codewords are used to
(Continued)

intensity modulate the optical source, without perceptible flicker.

22 Claims, 17 Drawing Sheets

(51) Int. Cl.
  *H04L 25/03* (2006.01)
  *H04L 1/06* (2006.01)
  *H04L 1/00* (2006.01)
(52) U.S. Cl.
  CPC ...... *H04L 1/0668* (2013.01); *H04L 25/03006* (2013.01); *H04L 2025/0335* (2013.01); *H04L 2025/03789* (2013.01)

(56) References Cited

U.S. PATENT DOCUMENTS

| | | | | |
|---|---|---|---|---|
| 7,689,130 | B2* | 3/2010 | Ashdown | H04B 10/1141 398/118 |
| 7,949,259 | B2 | 5/2011 | Suzuki | |
| 8,208,818 | B2* | 6/2012 | Sasai | H04B 1/707 398/185 |
| 8,401,394 | B2* | 3/2013 | Walewski | H04B 10/1141 375/238 |
| 8,494,367 | B2* | 7/2013 | Linnartz | H05B 33/0869 398/118 |
| 8,634,725 | B2* | 1/2014 | Jang | H04B 10/116 398/118 |
| 8,666,259 | B2* | 3/2014 | Lim | H04B 10/116 398/140 |
| 9,143,230 | B2* | 9/2015 | Casaccia | H04B 10/1149 |
| 2007/0058987 | A1 | 3/2007 | Suzuki | |
| 2008/0304833 | A1* | 12/2008 | Zheng | H04B 10/1143 398/135 |

FOREIGN PATENT DOCUMENTS

| | | |
|---|---|---|
| WO | WO-2014085124 A1 | 6/2014 |
| WO | WO-2014085128 A1 | 6/2014 |

OTHER PUBLICATIONS

Noshad, Mohammad, et al., "Multilevel Pulse-Position Modulation Based on Balanced Incomplete Block Designs", Globecom 2012—Optical Networks and Systems Symposium, (2012), 2930-2935.

Pointurier, Yvan, et al., "Cross-Layer Adaptive Routing and Wavelength Assignment in All-Optical Networks", IEEE Journal on Selected Areas in Communications, vol. 26, No. 6, (Aug. 2008), 32-44.

Pointurier, Yvan, et al., "Fair QoS-Aware Adaptive Routing and Wavelength Assignment in All-Optical Networks", IEEE ICC Proceedings—2006, (2006), 2433-2438.

Wang, X., et al., "Dynamic Grooming and RWA in Translucent Optical Networks Using a Time-Slotted ILP", Globecom 2012—Optical Networks and Systems Symposium, (2012), 2996-3001.

Wilson, Stephen G., et al., "Optical Repetition MIMO Transmission With Multipulse PPM", IEEE Journal on Selected Areas in Communications, vol. 23, No. 9, (Sep. 2005), 1901-1910.

Xu, Bo, et al., "Comparison of FWM- and XPM-Induced Crosstalk Using the Volterra Series Transfer Function Method", Journal of Lightwave Technology, vol. 21, No. 1, (Jan. 2003), 40-53.

* cited by examiner

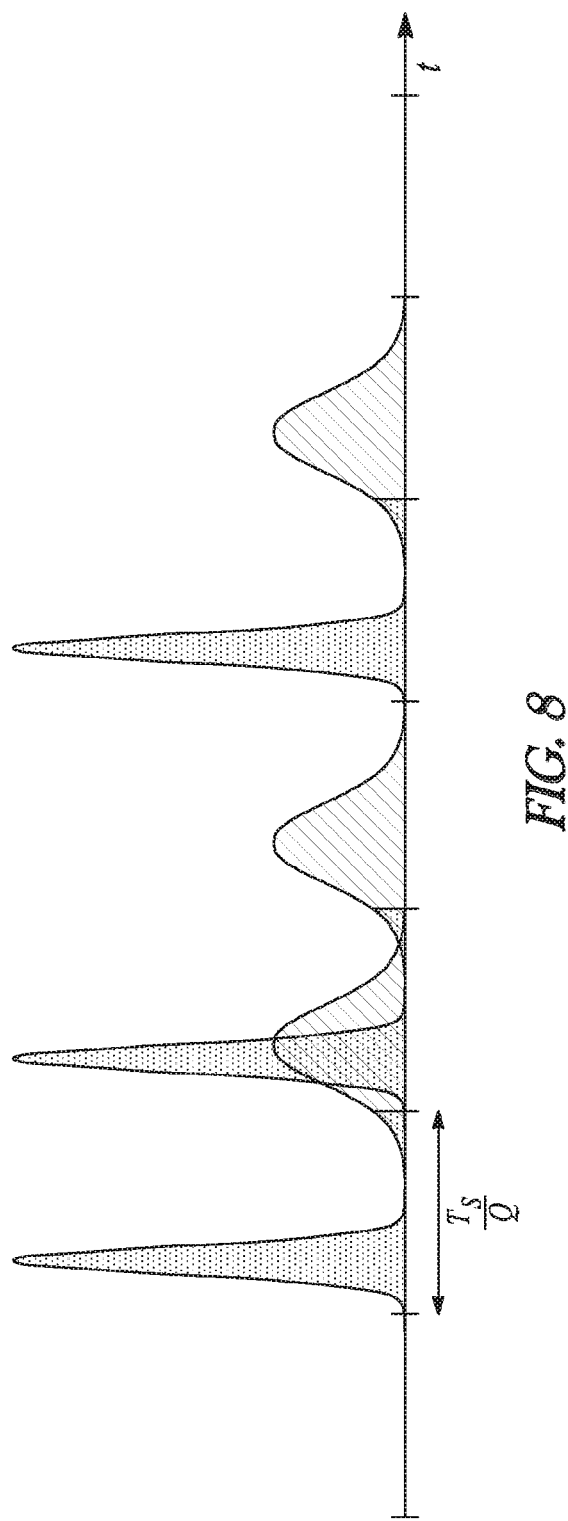

EXPURGATED PULSE POSITION MODULATION FOR COMMUNICATION

CLAIM OF PRIORITY

This patent application claims the benefit of priority of Brandt-Pearce et al., U.S. Provisional Patent Application Ser. No. 61/908,810 entitled "Expurgated Pulse Position Modulation for Indoor Visible Light Communications and Networks," filed on Nov. 26, 2013 which is hereby incorporated by reference herein in its entirety.

STATEMENT REGARDING FEDERALLY SPONSORED RESEARCH OR DEVELOPMENT

This invention was made with government support under 0901682 awarded by the National Science Foundation. The government has certain rights in the invention.

BACKGROUND

Growth in the use of smart phones and tablets has led to an increasing demand for wireless networking techniques that can provide high data rates, such as in indoor environments. Applications operating on mobile or portable devices can benefit from the availability of wireless networking data rates in the range of Gigabits per second per device, or beyond. Among the technologies competing for providing such high-speed wireless communication, optical wireless communication is a contender for the next generation in indoor interconnection and networking Such optical wireless communication can coexist with existing non-optical networks such as radio-based local area, wide area, and cellular networks. However, use of existing encoding and modulation techniques such as Optical Frequency Division Multiplexing (OFDM) can be problematic for free-space optical communication, particularly when using optical sources such as light emitting diodes that exhibit a non-linear intensity as a function of operating current. Similarly, simple pulse position modulation (PPM) can be inefficient from a spectrum consumption perspective, and can cause a perceptible flicker. Such flicker is generally undesirable and can even cause deleterious health effects in certain individuals.

OVERVIEW

In an example, an expurgated pulse position modulation (EPPM) technique can be used to encode information for wireless transmission. Such an EPPM technique can be compatible with relatively simple receiver architectures, such as a receiver architecture implemented using a shift register and a pulse position modulation (PPM) decoder. A multi-level EPPM (MEPPM) approach can further increase the available symbols in the modulation constellation and can be used to accommodate multiple users or devices concurrently. Interleaving techniques can be used such as to reduce error due to interference. An optical transmitter and an optical receiver can be used, such as including using energy in a visible range of frequencies. In an example, an optical source such as including one or more light emitting diodes can provide visible light for illumination. Such LEDs can also be used for wireless communication including using an EPPM scheme. The EPPM scheme can include using codewords specified to provide a desired dimming level when such codewords are used to intensity modulate the optical source, without perceptible flicker.

Enhancements to the EPPM or MEPPM technique can be provided such as by combining such encoding with an optically-orthogonal code (OOC), such as to accommodate multiple users or devices served by optical sources having spatially-overlapping transmission channels.

This overview is intended to provide an overview of subject matter of the present patent application. It is not intended to provide an exclusive or exhaustive explanation of the invention. The detailed description is included to provide further information about the present patent application.

BRIEF DESCRIPTION OF THE DRAWINGS

FIG. 8 illustrates generally an illustrative representation of received signal envelopes such as can be encountered in an indoor environment presenting a dispersive channel for visible light communications (VLC).

Figure 1A:
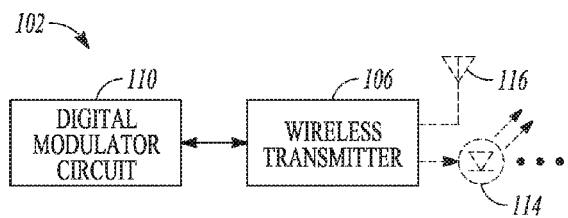
FIGS. 1A and 1B illustrate generally examples that can include a portion of a wireless communication system.

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Examples herein include techniques and apparatus that can be used for wireless communication. In particular, the apparatus and techniques described herein can be used as a portion of a visible light communication (VLC) system. In such examples, visible light can offer an advantage as compared to using infrared (IR) frequencies (or other non-optical communication frequencies) because VLC can be integrated with a visible light illumination system to offer a compact, dual-use, energy-saving solution.

VLC can offer other advantages as compared with other communication media, such as providing immunity to electromagnetic interference at radio or microwave frequencies, being generally safe for human health, and providing efficient utilization of available optical bandwidth. The localized range of VLC can also provide security by limiting opportunities for eavesdropping. VLC can provide high-speed access for tablets, phones, laptops and other devices, such as in enclosed spaces including offices, houses, airplanes, hospitals, and convention centers.

As mentioned above, a VLC scheme can be configured to provide indoor lighting as well as communication capabilities. For example, dimming is a desirable feature of indoor lighting systems through which the illumination level can be controlled. A VLC can be configured to support various optical peak-to-average power ratios (PAPR) so that a specified peak power the average power, which is generally proportional to the illumination level, can be regulated to provide a desired dimming level.

In another approach, continuous current reduction (CCR) and pulse-width modulation (PWM) are two techniques that have been proposed for dimming in indoor VLC systems; however the present inventors have recognized, among other things, that such techniques generally include use of large bandwidths, and are therefore generally not suitable for high-rate communication systems.

Flicker is another consideration that can be accommodated by a VLC system. Flicker generally refers to a fast fluctuation of the illumination that can be perceived by human eyes and therefore is generally to be avoided. After long-term exposure, flicker can be harmful to the eye and affect eyesight. In VLC systems, since the lighting function can be integrated with the communication system, an inappropriate modulation scheme can cause variations in the average transmitted power, and impose perceptible fluctuations on the brightness of the LEDs. Therefore, constraints are generally applied to modulation techniques that are aimed at dual-use VLC systems. Flicker can become more easily perceptible when a data rate is low, or the lights are dimmed to a low illumination level.

In VLC systems, white or other light emitting diodes (LED) can be used as optical sources. Accordingly, a range of available modulation schemes that can be used with such LED sources is somewhat limited. For example, Optical Frequency Division Multiplexing (OFDM) and spatial modulation (SM) are approaches for VLC that can be used to provide high-speed data transmission. But, such approaches can have challenges. For example, using OFDM, tails of the impulse response can be long, such that implementation generally includes a long cyclic prefix for OFDM to work, reducing throughput. Dimming can be another challenge in utilizing OFDM in indoor VLC. OFDM has a naturally high PAPR, but it is not easily controllable. A solution for embedding the dimming function in OFDM is to combine it with PWM, but such an approach limits the data rate and can cause flicker. Furthermore, a nonlinearity of LED sources can limit the performance of OFDM modulation techniques.

The SM approach can also present drawbacks. One drawback of SM in VLC system is its susceptibility to shadowing and multipath interference. For example, in a highly dispersive indoor channel, the signals received via different paths can cause severe interference between transmissions at the receivers. While while rich scattering channels resulting from Non-Line-of-Sight (NLOS) conditions can help RF systems generally by providing diversity, in intensity-modulated optical systems such a multipath condition primarily causes interference.

In one approach, a receiver's field of view (FOV) can be narrowed, which can reduce interference at the expense of increasing the vulnerability to shadowing, increasing the blocking probability at the receiver. However, for commercially viable built-in or dongle-based VLC transceivers, a size of the devices needs to be fairly small, and a SM receiver including multiple detectors may not be practical or desirable for end users.

The present inventors have developed, among other things, modulation techniques that can be used for wireless communications, and particularly for visible light communication (VLC) while providing dimming capability and control over flicker. A generalized form of PPM called expurgated PPM (EPPM) can be used to decrease the bit-error probability in wireless systems with power-limited sources, such as wireless optical systems. Balanced incomplete block designs (BIBD) can be used to generate the symbols of EPPM, and therefore, the symbols are cyclic shifts, which simplifies the structure of the transmitter and receiver and they can be simply implemented using shift-registers. The symbols of EPPM can be shown to have the lowest BER compared to any other set of symbols for specified word length. Multilevel forms of EPPM can be used to increase the spectral-efficiency of EPPM and improve its performance in bandwidth limited channels. In a multi-level approach, a linear combination of EPPM symbols can be generated.

EPPM and MEPPM techniques can enable a wireless communication system to operate over a wide range of PAPRs by controlling the ratio of the code-weight to the code-length of the generating code. In an example, interleaving can be applied on EPPM and MEPPM, such as to reduce interference between the adjacent time-slots in dispersive channels and increase a data rate. Overlapping the pulses in EPPM and MEPPM can provide high transmission rates for wireless sources having limited bandwidth, such as white LEDs that have a limited bandwidth. The application of these techniques can be generalized to other peak-power limited communication system with restricted channel or source bandwidth.

Techniques and apparatus are described herein based on an MEPPM modulation scheme to provide multiple access for devices or users, concurrently. Such approaches can be referred to as synchronous Optical Code Division Multiple Access (OCDMA) methods, and can enable multiple users or devices in a network to have high-speed access to the network. In a first approach, one OOC codeword can be assigned to each user or device in order to encode its M-ary data and transmit the cyclic shifts of the assigned OOC codeword as symbols. For each user or device, every bit of this encoded binary sequence is generally multiplied by a BIBD codeword, and then the OOC-encoded BIBD codewords are added to generate a multilevel signal. Hence, the PAPR of the transmitted data can be controlled by changing the code-length to code-weight ratio of the BIBD code.

In a second approach, a subset of BIBD codewords can be assigned to each user or device, and then the MEPPM scheme can be used to generate multi-level symbols using the assigned codewords. In the second approach, users or devices can have different bit-rates by partitioning the BIBD code into unequal-size subsets.

Figure 1B:
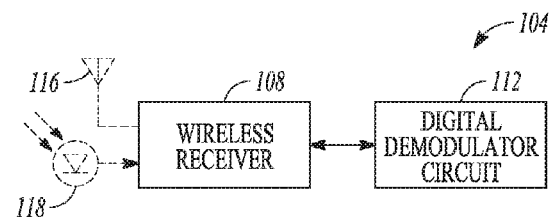

FIGS. 1A and 1B illustrate generally examples that can include a portion of a wireless communication system. In FIG. 1A, a transmitter system 102 can include a digital modulator circuit 110, such as can be configured to provide modulation of information according to a digital encoding scheme. The modulated information can be provided to a wireless transmitter 106, such as for transmission over a wireless network using a wireless source, such as can include one or more of an antenna 116 or an optical source. For example, the optical source can include a light emitting diode (LED) 114 or a laser. According to various examples described herein, an optical source can include an array of LEDs.

The digital modulator circuit 110 can be coupled to an analog modulator, such as to provide intensity modulation of energy output by the wireless transmitter 106. In an example, the digital modulator circuit 110 can configured to provide digitally encoded information using a pulse-position modulation (PPM) encoding scheme, the pulse-position modulation encoding scheme including modulated information comprising a linear combination of expurgated PPM (EPPM) symbols, the EPPM symbols selected from a constellation including (1) a cyclic series of symbols or (2) a combination of the cyclic series of symbols and logical complements of the cyclic series of symbols. The wireless transmitter 106 can be configured to receive information from the digital modulator circuit 110 and configured to wirelessly transmit the modulated information by varying an amplitude of energy output by the wireless source.

In FIG. 1B, a receiver system 104 can include a digital demodulator circuit 112, such as can be configured to demodulate information provided by the transmitter of FIG. 1A, according to a digital encoding scheme. Modulated information can be received using a wireless receiver 108, such as information coupled to the wireless receiver 108 using one or more of an antenna 116 or an optical detector. For example, the optical detector can include a diode-based detector 118 or transistor-based detector, for example. Coupling optics such as one or more lenses or waveguides can be used to couple incoming optical energy to the optical detector.

Figure 2:
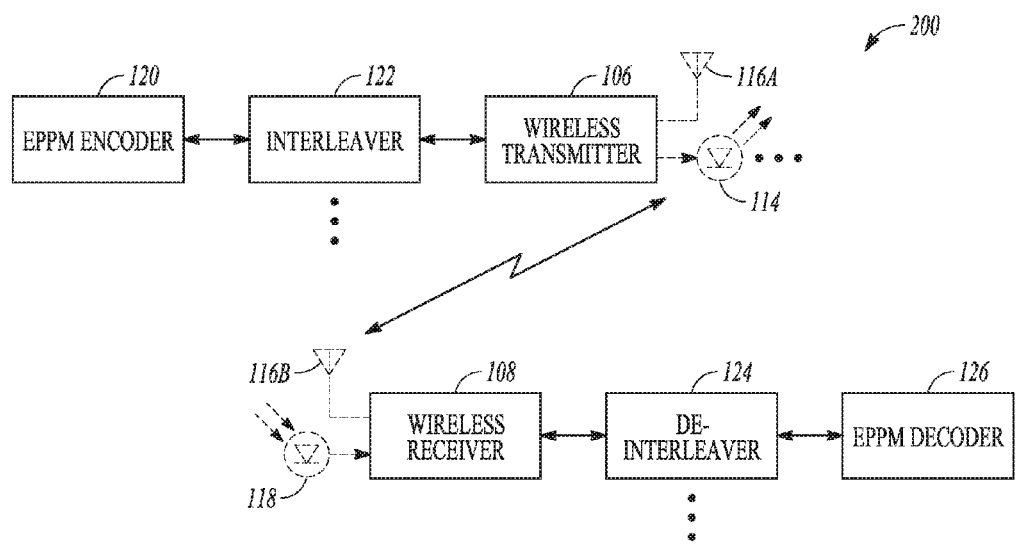
FIG. 2 illustrates generally an example of a communication system including an interleaver and a de-interleaver.

FIG. 2 illustrates generally an example of a communication system 200 that can include an interleaver 122 and a de-interleaver 124. The communication system can include an EPPM encoder 120 (such as included as a portion of a digital modulator circuit as shown in FIG. 1A or described elsewhere herein), and a wireless transmitter 106. The wireless transmitter 106 can be coupled to one or more of an antenna 116A or optical source such as an LED 114 or an array of LEDs. A wireless receiver 108 can receive modulated information such as using one or more of a second antenna 116B or optical receiver such as a diode detector 118. The received information can be provided to a de-interleaver 124 such as coupled to an EPPM decoder (such as can be included as a portion of a digital demodulator circuit as shown in FIG. 1B). In this manner, interference between adjacent time slots or chips can be reduced as shown and described in other examples here.

Figure 3:
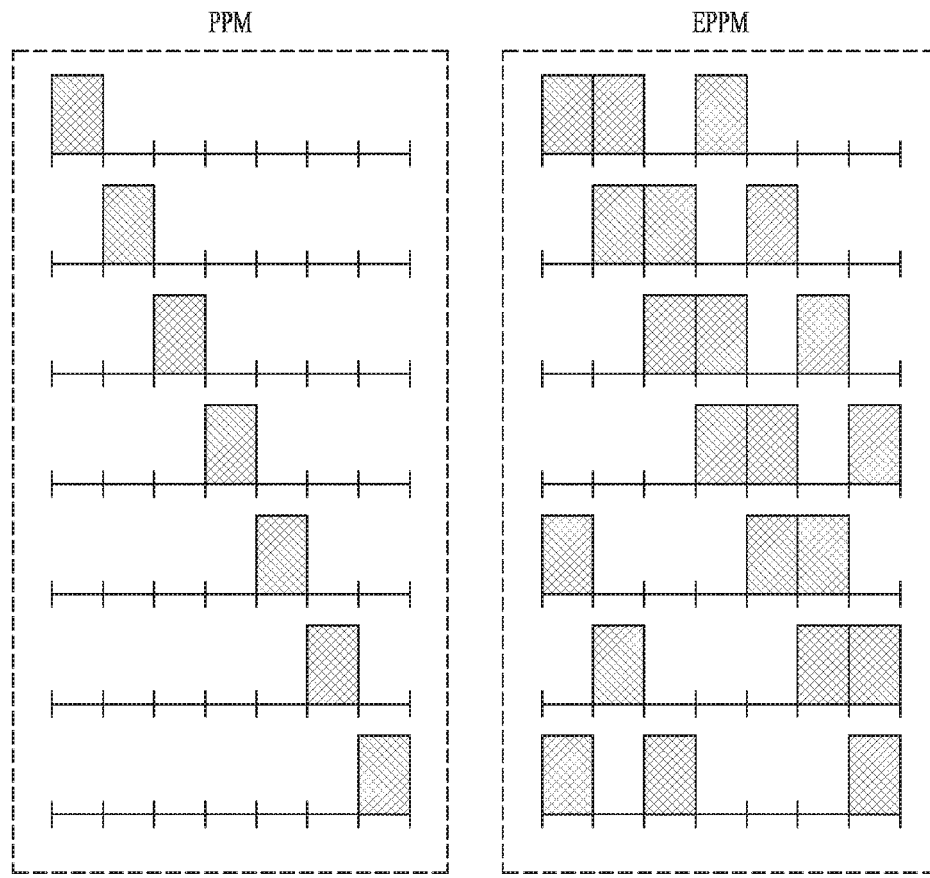
FIG. 3 illustrates generally an illustrative example of a 7-symbol PPM code, and an example of a 7-symbol EPPM code.

FIG. 3 illustrates generally an illustrative example of a 7-symbol PPM code, and an example of a 7-symbol EPPM code. In an EPPM scheme, a symmetric balanced incomplete block design (BIBD) code can be used to provide modulated symbols, such as to increase a Hamming distance between symbols. Because of the cyclic structure of the BIBD codes, the transmitter and receiver can have low complexity, and can be implemented, for example, using shift registers. A BIBD code can be identified by parameters $(Q, K, \lambda)$, where Q can represent a length, K can represent a Hamming weight, and $\lambda$ can represent a cross-correlation between two codewords. The mth codeword can be denoted by a vector $c_m=(c_{m1}, c_{m2}, \ldots, c_{mQ})$, $m=1, 2, \ldots, Q$, where $c_{mi} \in \{0,1\}$. The following relation holds between $c_m$'s $$\sum_{i=1}^{F} c_{mi} c_{ni} = \begin{cases} K; & m = n \\ \lambda; & m \neq n \end{cases}, \quad \text{(EQN. 1)}$$

FIG. 3 illustrates an illustrative example of a PPM code (on the left), and an EPPM code (shown at right in FIG. 3), for values $Q=7$, $K=3$ and $\lambda=1$.

Figure 4:
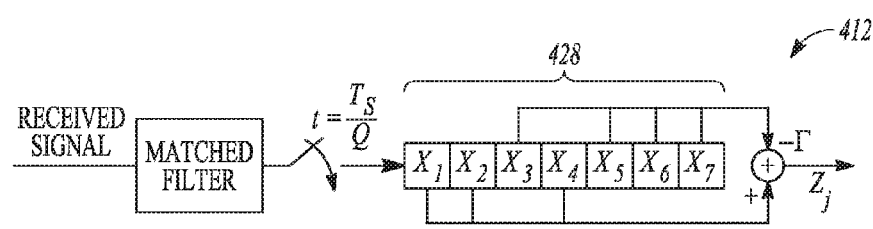
FIG. 4 illustrates generally an illustrative example of at least a portion of a receiver architecture such as can be used to decode the 7-symbol EPPM code shown illustratively in FIG. 3.

FIG. 4 illustrates generally an illustrative example of at least a portion of a receiver architecture 412 such as can be used to decode the 7-symbol EPPM code shown illustratively in FIG. 3 (e.g., $Q=7$). For the code shown illustratively in FIG. 3, a receiver can be implemented as a shift register 428 followed by a differential circuit. This detection scheme can be considered equivalent to a correlation receiver. In the illustrative example of FIG. 4, $x=\{x_1, x_2, \ldots, x_q\}$ can represent stored digitally-modulated information received corresponding to Q time-slots, and $$\Gamma = \frac{\lambda}{K - \lambda}.$$

In each symbol period, the receiver can generate Q variables at the output of the differential circuit by circulating the stored data in the shift register. The combination of the shift register and the differential circuit can generate a decision statistic $Z_j=(x, c_j)-\Gamma=(x,\bar{c}_j)$, for j=1, 2, . . . , Q, where (x, y) represents a dot product of the vectors x and y, and where $\bar{c}_i$ can represent a complement of $c_i$. Due to the fixed cross-correlation property of the symbols in EPPM, when symbol l is sent the expected value of $Z_l$, $E\{Z_l\}=K$, and $E\{Z_j\}=0$ for j≠l. So, in each symbol period, a set $\{Z_1, Z_2, \ldots, Z_q\}$ can be formed, and the received symbol can be chosen by selecting the time slot having the largest value.

As mentioned above, the present inventors have recognized that a peak-to-average power ratio (PAPR) can be controlled using an EPPM scheme. In a (Q,K,λ)-EPPM, the PAPR can be represented as Q/K, and this ratio can be controlled by choosing a BIBD code to provide the corresponding ratio. There are a number of BIBD families with various code-weight to code-length ratios, and they provide a broad range of selectable dimming levels. For example, the illustrative example shown in Table 1 (below) lists Q/K ratios for some available BIBD codes.

TABLE 1

Illustrative Examples including BIBD codes and corresponding Q/K ratios.

| (Q, K, λ) | Q/K | (Q, K, λ) | Q/K |
|---|---|---|---|
| (35, 17, 8) | 2.058 | (21, 5, 1) | 4.2 |
| (11, 5, 2) | 2.2 | (31, 6, 1) | 5.167 |
| (7, 3, 1) | 2.33 | (57, 8, 1) | 7.125 |
| (40, 13, 4) | 3.077 | (91, 10, 1) | 9.1 |
| (13, 4, 1) | 3.25 | (183, 14, 1) | 13.07 |
| (109, 28, 7) | 3.89 | (381, 20, 1) | 19.05 |

As shown above, the PAPR for BIBD codes is generally larger than 2; but the present inventors have also recognized that the complement of a (Q,K,λ)-BIBD code has a PAPR of Q/(Q−K), and thus, in order to achieve a PAPR smaller than 2, the complements of BIBD codes can also be used to construct the EPPM symbols.

Figure 5:
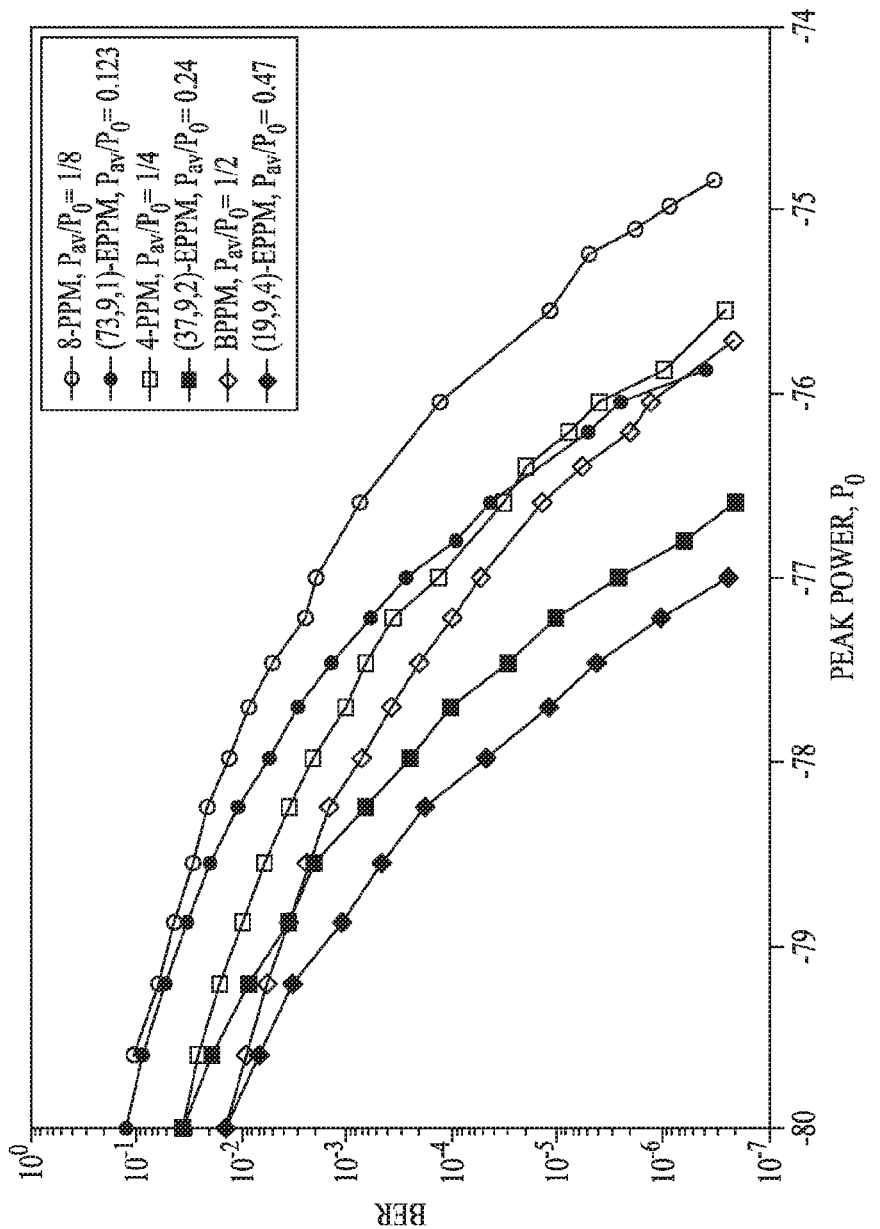
FIG. 5 illustrates generally an illustrative example of simulated bit error rates (BERs) versus received peak power corresponding to different encoding techniques and different peak-to-average power ratios (PAPRs).

FIG. 5 illustrates generally an illustrative example of simulated bit error rates (BERs) versus received peak power corresponding to different encoding techniques and different peak-to-average power ratios (PAPRs). The simulated BERS of EPPM and PPM are compared for PAPRs of 2, 4 and 8 at a bit rate of 200 megabits per second (Mbits/s) for a single output color assuming ideal LEDs and an ideal VLC channel without any inter-symbol interference (ISI) effect. Shot noise is assumed to be the dominant noise, and a background light level was set to 0.1 microwatts (μW). According to the results shown in FIG. 5, for peak-power limited systems, the performance of EPPM surpasses that of PPM for all three PAPR levels, since EPPM results in transmission of more than one pulse during each symbol period.

Figure 6:
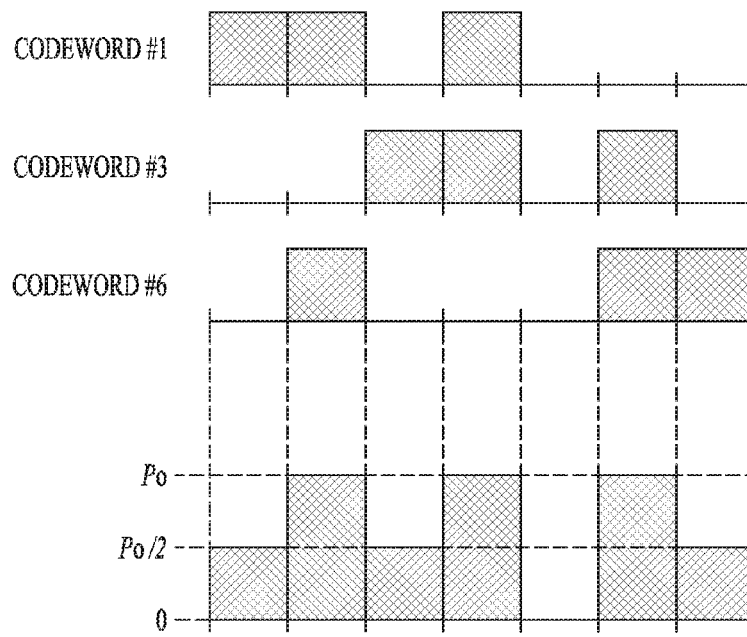
FIG. 6 illustrates generally an illustrative example of a multi-level EPPM (MEPPM) code, such as can be constructed using code words 1, 3, and 6 of a (7,3,1) balanced incomplete block design (BIBD) code.

FIG. 6 illustrates generally an illustrative example of a multi-level EPPM (MEPPM) code, such as can be constructed using codewords 1, 3, and 6 of a (7, 3, 1) balanced incomplete block design (BIBD) code. In an example, a multilevel EPPM (MEPPM) scheme can be used. MEPPM is similar to EPPM in an aspect that a symbol period can be divided into Q equal time-slots. For MEPPM, respective symbols can be obtained as a sum of N BIBD codewords from the same code, resulting in new length-Q codewords. We focus on cyclic BIBDs, for which the codewords are cyclic shifts of each other. For example, to build a symbol k, N codewords can be chosen, represented as $C_{k_n}$, where n=1, 2, . . . , N, $k_n \in \{1, 2, \ldots, Q\}$, which results in $S_k=(s_{k1}, s_{k2}, \ldots, s_{kQ})$, where $s_{ki}$ can be obtained as $$s_{ki} = \sum_{n=1}^{N} c_{k_n i}. \qquad \text{(EQN. 2)}$$

According to this example, the symbols of an MEPPM constellation have equal weight, where the weight of each symbol can be represented as NK. The illustrative example of FIG. 6 illustrates generally a technique for generation of an MEPPM symbol from three BIBD codewords (N=3). In this illustrative example, codewords $C_1$, $C_3$ and $C_6$ of a (7,3,1)-BIBD code are added to create a symbol with length 7 and weight 9. In this manner, the symbols in the MEPPM scheme can represent a linear combination of EPPM symbols. In an example, the symbols in the MEPPM scheme can represent a linear combination of EPPM symbols and complements of EPPM symbols.

Figure 7A:
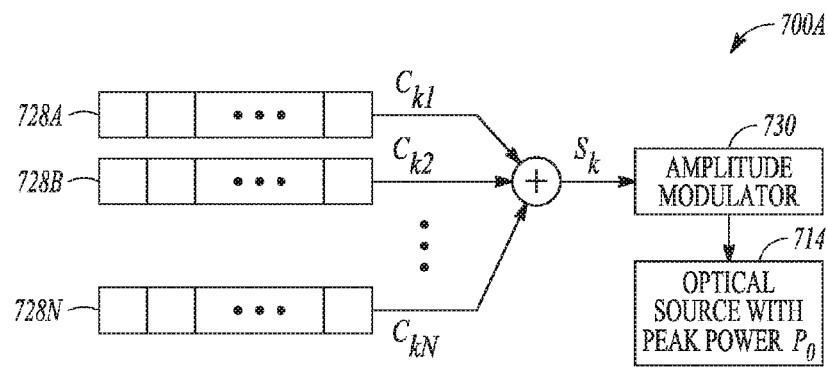
FIGS. 7A and 7B illustrate generally illustrative examples of at least a portion of transmitter architectures that can be used to modulate and transmit an MEPPM code, such as shown illustrative in FIG. 6.
Figure 7B:
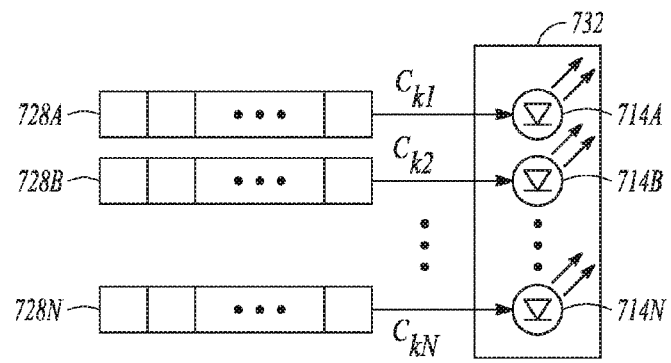

FIGS. 7A and 7B illustrate generally illustrative examples of at least a portion of transmitter architectures that can be used to modulate and transmit an MEPPM code, such as shown illustratively in FIG. 6. The BIBD code used to generate the multilevel EPPM symbols is generally cyclic, and accordingly a symbol generator circuit at the transmitter can be implemented using N shift registers 728A, 728B, . . . 728N, in N branches, such as shown illustratively in the examples of FIGS. 7A and 7B. Generally, a number of branches, N, can be different from the number of levels, L, in the MEPPM scheme. In examples wherein optical transmission is used, an optical source in the transmitter can include, for example, a laser or an LED. Therefore, there can be at least two structures that can be used for the transmitter architecture.

In a first example, shown in FIG. 7A, each shift register 728A, 728B . . . 728N, can generate one BIBD codeword, and then outputs of these N branches can be added to generate a corresponding L-level MEPPM symbol. The symbol generated can be provided to an amplitude modulator 730, which can modulate an output parameter (e.g., current or output power) to a transmitting element such as an optical source 714 to control an output of the source. In the illustrative example of FIG. 7B, an array of optical sources 732 can be used, such as including individual output elements (e.g., LEDS 714A, 714B, . . . 714N) that can be coupled to respective outputs of shift registers 728A, 728B, . . . 728N, such as to provide a spatially-compounded MEPPM output via superposition of the outputs from each of elements in the array 732.

Lasers, when used as transmitters in free-space optical (FSO) systems, are generally peak-power-limited sources, and according to an example an output optical power can be modulated between 0 and a peak power value, $P_0$. The number of power levels can be flexible. For symbol $S_k$, the output power of the source in a time-slot, i, can be represented as $s_{ki}P_0/(L-1)$.

Due to the fixed cross-correlation property of BIBD codewords, assuming that $C_l$ is transmitted, its contribution in the expected value of $z_l$ can be represented as $$E\{z_l\} = \frac{\epsilon}{L-1}K,$$

and in $z_j$; $j \neq l$, is $E\{z_j\}=0$, where $\epsilon$ is the received energy in one time-slot for an unmodulated transmitted signal with peak power $P_0$. Depending on whether the codewords used in the generation of the symbols must be distinct or not, MEPPM can be implemented according to two illustrative examples:

Type I: where the N branches generate distinct codewords, and each codeword is used at most once in the generation of each symbol, i.e., $k_n \neq k_m$ for $\forall n \neq m$. Hence, the total number of symbols for type I MEPPM with N branches is $$\binom{Q}{N}.$$

This constellation size is maximized for $N=Q/2$.

Type II: In this example, different branches are allowed to have the same codewords, where one codeword can be used more than once in the generation of each symbol. To calculate a constellation size, $n_k$ can represent a number of branches that have codeword $C_k$, where $0 \leq n_k \leq N$, which can be represented as a sum $$\sum_{k=1}^{Q} n_k = N.$$

The constellation size for this example can be represented as $$\binom{Q+N}{N}.$$

In an example, complements of the BIBD codewords can also be included as symbols in EPPM with only a minor penalty on the minimum distance. The scheme that is obtained by including the complements of codewords can be referred to as augmented EPPM (AEPPM). Similarly, a constellation size can be increased by using such complements in an MEPPM scheme. According to the transmitter architectures of FIGS. 7A and 7B, N codewords can be chosen out of Q, and then in each branch a choice can be made between codeword and its complement. Such a scheme can be referred to as multilevel AEPPM (MAEPPM). In this way, the constellation size (e.g., an available number of symbols) can be increased to $$2^N \binom{Q}{N}$$

for type I MAEPPM and to $P_N^{(Q-N,-1)}(3)$ for type II, where $P_n^{(\alpha,\beta)}(x)$ is the Jacobi polynomial.

FIG. 8 illustrates generally an illustrative representation of received signal envelopes such as can be encountered in an indoor environment presenting a dispersive channel for visible light communications (VLC). An example of a bit-rate-limiting factor in indoor VLC systems is the multipath effect. The multipath effect broadens the transmitted pulses and imposes ISI on the transmitted data as shown illustratively in FIG. 8. A given codeword $c_m$ can be sent, and $$\sum_l h_l c_m^{(l)}$$

can be received at the output of the channel. Because the symbols of EPPM are cyclic shifts, $c_m^{(l)} = c_{m+l}$, the received signal can be represented as $$\sum_l h_l c_{m+l}.$$

Hence, the distances between the adjacent symbols decrease at the output of the channel in the presence of multipath effect and this effect generally increases an error probability. The present inventors have also recognized that interleaving can be introduced as an effective technique to improve the performance of EPPM techniques in multipath channels, which makes EPPM and related improvements described herein (e.g., MEPPM and MEAPPM) appealing as an alternative to PPM in dispersive communication systems.

To diminish the impact of ISI, an interleaver and de-interleaver can be used in the transmitter and receiver, as shown in the example of FIG. 2. The interleaver can be implemented by applying a permutation matrix that can be represented by $\pi$ to an outgoing message, and the de-interleaver can apply an inverse of such a permutation matrix, $\pi^{-1}$. So instead of $c_m$, $c_m \pi$ can be transmitted, resulting in rearrangement of the transmitted pulses. A code length and a code weight, Q and K, respectively of a $(Q,K,\lambda)$-EPPM scheme can remain the same after the interleaver, and hence, the interleaver does not change the PAPR.

Figure 9A:
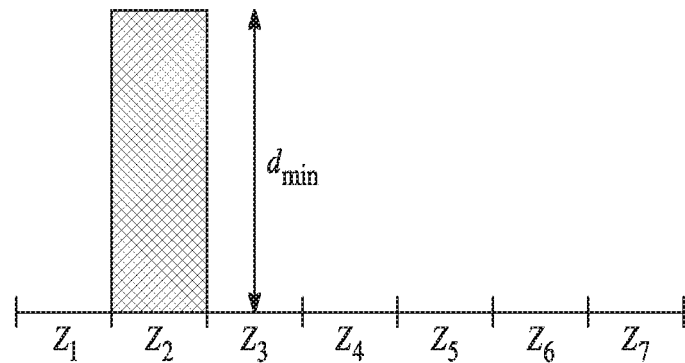
FIGS. 9A through 9C illustrate generally illustrative examples of a minimum distance between EPPM symbols corresponding to an ideal non-dispersive channel in FIG. 9A, a dispersive channel in FIG. 9B where no interleaving is used, and a dispersive channel in FIG. 9C where interleaving is used.
Figure 9B:
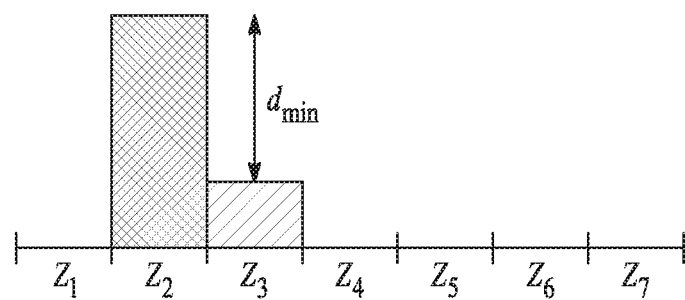
Figure 9C:
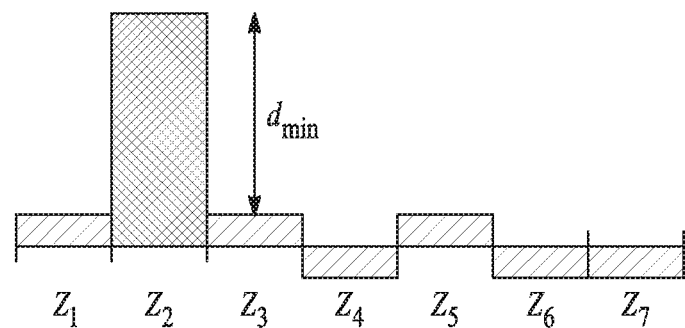

FIGS. 9A through 9C illustrate generally illustrative examples of a minimum distance between EPPM symbols corresponding to an ideal non-dispersive channel in FIG. 9A, a dispersive channel in FIG. 9B where no interleaving is used, and a dispersive channel in FIG. 9C where interleaving is used.

The examples of FIGS. 9A through 9C can represent an output of a decoder and the effect of the interleaver on the decoded signal. In the dispersive channel of the example of FIG. 9B, a tail of the received pulses due to the dispersive channel interferes with one adjacent symbol (e.g., $Z_3$), and it does not have any effect on the other symbols (e.g., $Z_1$, and $Z_4$ through $Z_7$). Therefore, the minimum distance between decoded signals is considerably reduced. Adding an interleaver can spread the interference over all symbols, and hence, the minimum distance between decoded signals become larger, such as shown in the example of FIG. 9C (e.g., $d_{min}$ is larger in magnitude than in the example of FIG. 9B). As mentioned above, the same interleaving technique can also be used for MEPPM, and the interference between symbols of MEPPM can be reduced in dispersive channels using an interleaver and de-interleaver. MEPPM is believed particularly suitable for dispersive channels, since MEPPM can achieve higher spectral-efficiencies compared to EPPM due to MEPPM having a larger constellation size, and thus, larger symbol-time. Hence, interleaved multilevel-EPPM can achieve even lower error probabilities in bandwidth limited channels as compared to other techniques.

Figure 10A:
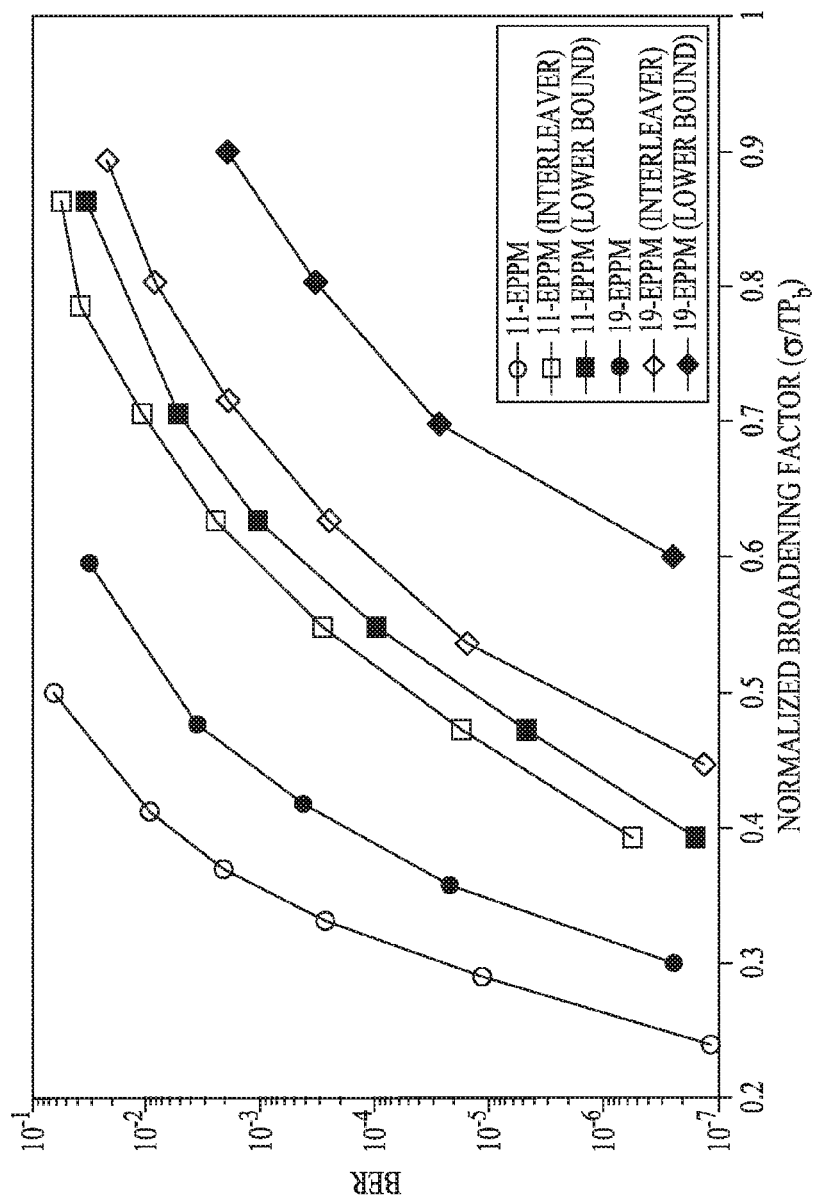
FIGS. 10A through 10C illustrate generally illustrative examples of simulated BERs versus a normalized broadening factor ($\sigma/T_b$).
Figure 10B:
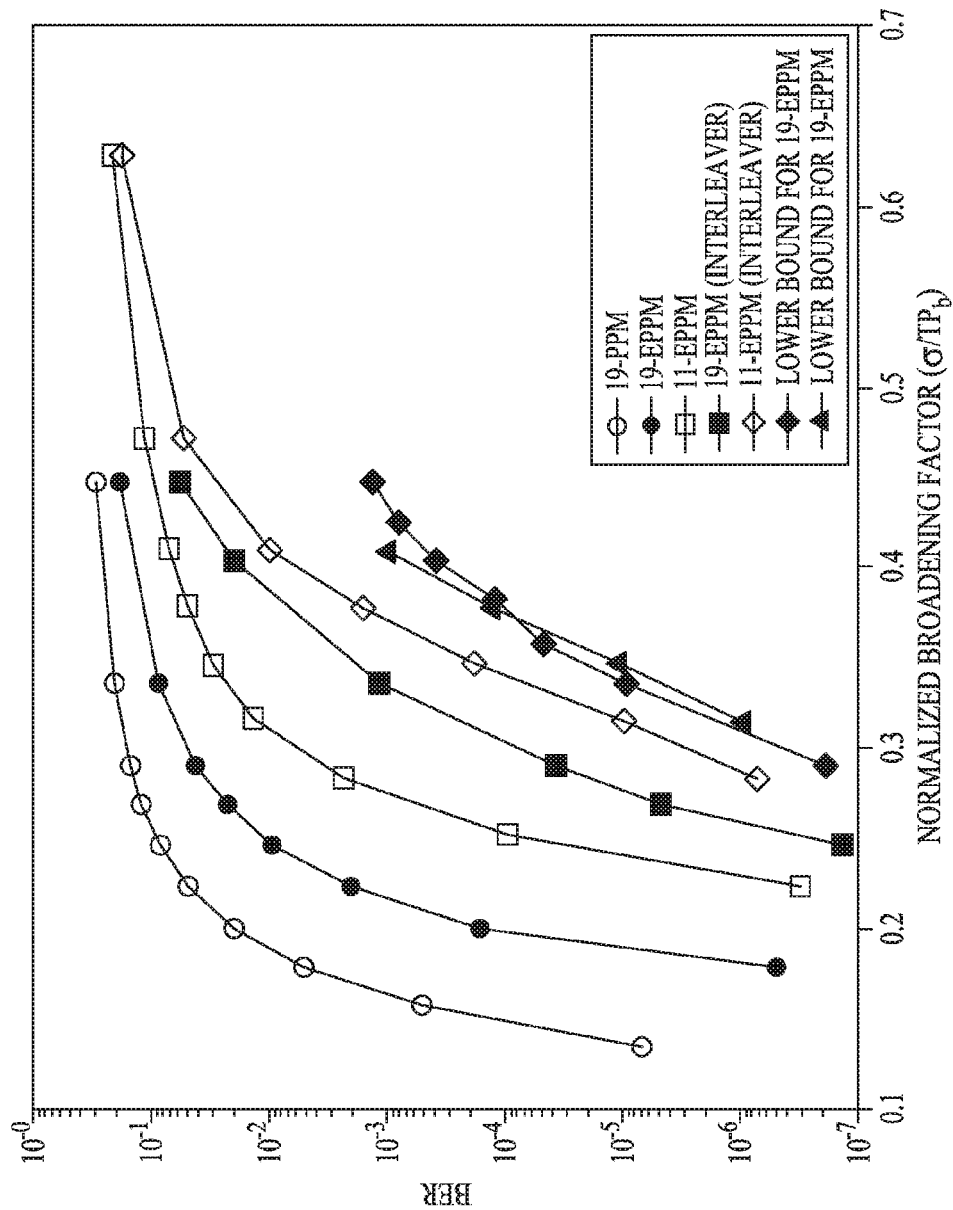
Figure 10C:
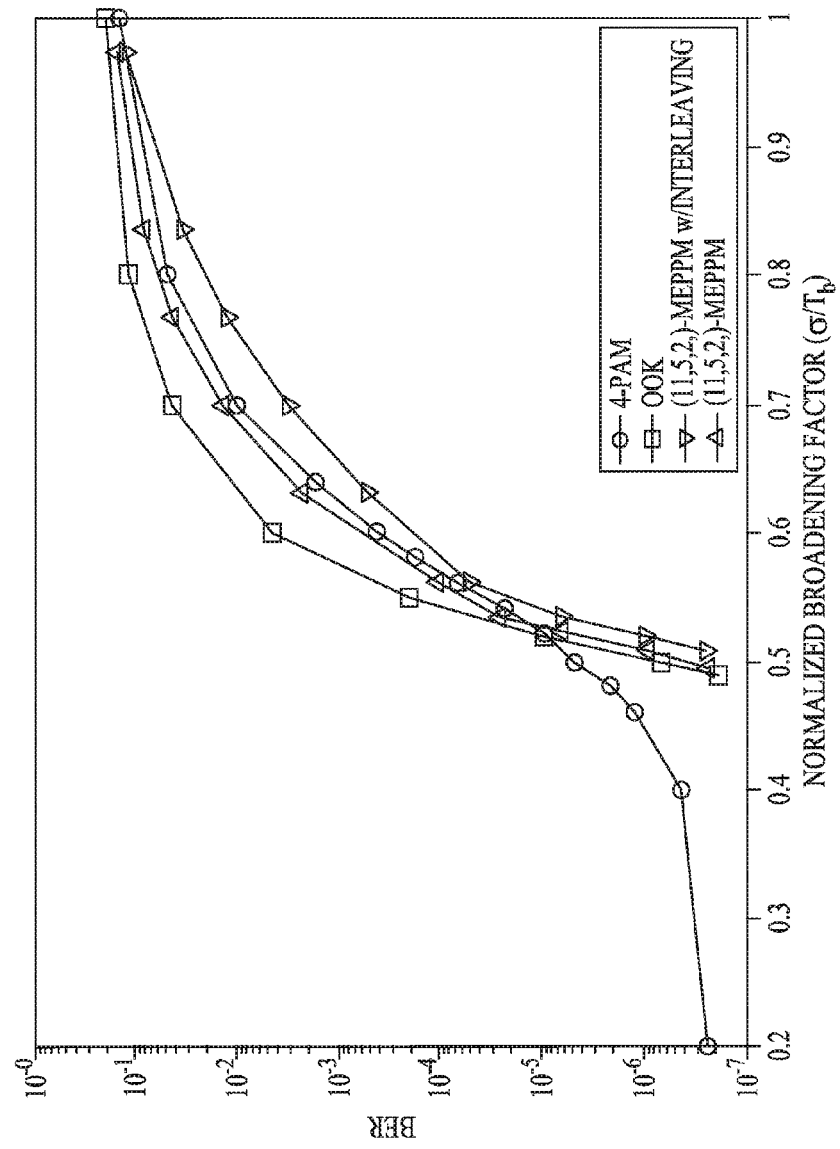

FIGS. 10A through 10C illustrate generally illustrative examples of simulated BERs versus a normalized broadening factor ($\sigma/T_b$). In FIG. 10A, a simulated BER versus normalized broadening factor ($\sigma/T_b$) is shown illustratively for PPM and EPPM with and without interleaving using (11,5,2) and (19,9,4) BIBD codes in a VLC channel with LOS and NLOS paths. The simulated BERs of (11,5,2)-EPPM and (19,9,4)-EPPM with and without interleaving are plotted versus the normalized broadening factor in this illustrative example. The results are simulated assuming perfect symbol synchronization for two different code lengths and for a VLC system limited by multipath, shot noise and background noise at a bit-rate of 200 Mbits/s per color. In this illustrative example, no equalizer is used at the receiver side. These results are simulated for a VLC channel with 0.1 μW background light where the channel is a combination of line-of-sight (LOS) and non-line-of-sight (NLOS) path responses. The energy received via the LOS path is assumed to be $5 \times 10^{-14}$ Joules (J). The delay between LOS and NLOS responses, τ, is assumed to be small compared to the symbol-time $T_s$.

In the example of FIG. 10A, an increasing σ is assumed to be caused by increasing the number of reflecting objects and surfaces. Hence, without being bound by theory, large σ's are assumed to correspond to stronger interference signals, and the NLOS impulse response can be approximated by a Gaussian pulse with a fixed peak power of 0.1 μW, such as provided by $h_{NLOS}(t) \sim \exp(-t^2/2\sigma^2)$. This power can be considered equivalent to a NLOS illumination level of 1 lux (lx). By increasing σ, an energy of the multipath signal becomes larger. According to these results, for EPPM with a larger code-length, an energy of the interference signal is divided between a larger number of time chips, and therefore, it achieves a lower BER compared to an EPPM scheme having a shorter code length.

In FIG. 10B, a simulated BER versus normalized broadening factor is shown for PPM and EPPM with and without interleaving using (11,5,2) and (19,9,4) BIBD codes in a VLC channel with blocked LOS path (e.g., representing only the NLOS portion of the impulse response). The illustrative example of FIG. 10B shows the interleaving effect on the BER of EPPM for a receiver that does not have any LOS path to the optical sources (LEDs in this illustrative example). In FIG. 10B, BER is plotted versus the normalized broadening factor, where the multipath is assumed to have a Gaussian-shaped impulse-response, such as provided by $$h_{NLOS}(t) \sim \frac{1}{\sqrt{2\pi}\sigma} \exp(-t^2/2\sigma^2).$$

In this illustrative example, energy received from NLOS can be assumed to be $5 \times 10^{-14}$ J, and the power of the background light can be assumed to be 0.1 μW. The permutation matrices for the interleavers are obtained as outlined above. According to the illustration of FIG. 10B, the BER of (19,9,4)-EPPM is lower than PPM with the same length. Moreover, the BER of EPPM can be further reduced using an interleaver with well-selected permutation matrix. Similar results can be obtained as shown by simulation for (11,5,2)-EPPM. Lower bounds on the BER of the interleaved EPPM are also included in the illustrative example of FIG. 10B, which without being bound by theory, indicate ultimate BERs for EPPM that can be achieved using interleaving according to the simulated constraints.

In FIG. 10C, simulated BER versus normalized broadening factor ($\sigma/T_b$) are shown for one-off keying (OOK), 4-ary PAM and 11-level type-II MEPPM with and without interleaving. The BERs of 11-level type-II MEPPM using a (11,5,2)-BIBD code, OOK and 4-ary PPM are plotted versus normalized broadening factor assuming the VLC system as described for the example of FIG. 10A. A received power and background power are assumed to be 0.1 μW. Although 4-PAM has a better performance for high dispersive channels compared to OOK and MEPPM without interleaving, its BER is large for channels with weaker multipath effect. The BER of MEPPM is improved by up to 2 dB using interleaving, and its performance surpasses 4-PAM in all dispersive links according to the illustrative example of FIG. 10C.

Figure 11A:
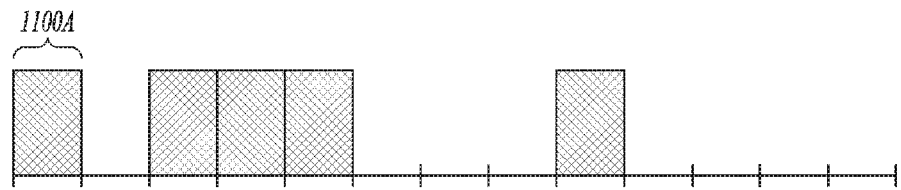
FIGS. 11A and 11B illustrate generally illustrative examples of an EPPM symbol in FIG. 11A and a corresponding overlapping EPPM symbol.
Figure 11B:
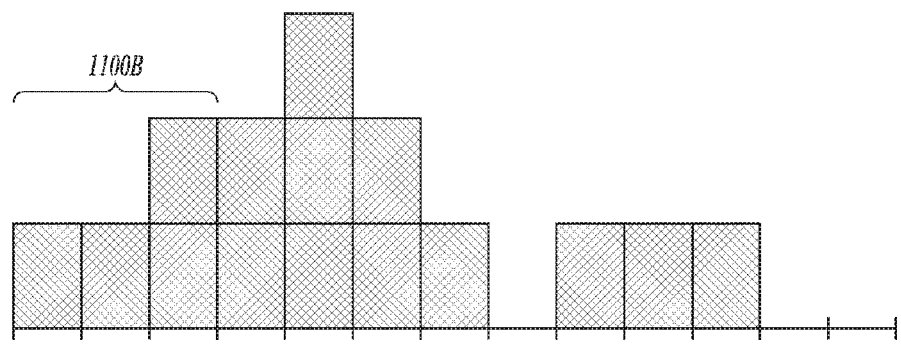

FIGS. 11A and 11B illustrate generally illustrative examples of an EPPM symbol in FIG. 11A and a corresponding overlapping EPPM symbol. The present inventors have also recognized that bandwidth limitations or slew rate limitations of optical sources such as LEDs can seemingly impose a lower limit on time chip duration available for transmission of EPPM codes. The present inventors have recognized that for codes having a chip duration shorter than the time domain response of the LED, a duration of a particular pulse 1100A in the EPPM code can be stretched to provide a pulse duration 1100B comprising more than one time chip. A multi-level code can be implemented by allowing such stretched durations to overlap as shown in FIG. 11B.

An overlapping pulse technique can be combined with an EPPM scheme in order to increase the symbol-rate in VLC systems. Such a scheme can be referred to generally as overlapped EPPM (OEPPM). In an example that can include OEPPM, pulses generated by an optical source such as an LED can be ν times wider than a time-slot. For an OEPPM scheme that uses a (Q,K,λ)-BIBD code to modulate the symbols, each symbol can be divided into (Q+ν−1) equal time-slots, and K pulses with width ν can be transmitted in each symbol period. As shown illustratively in FIG. 11A, rising edges of the pulses can be set by the "1"s in the corresponding BIBD codeword. In this figure, each shade can indicate on and off times for a respective LED in a transmitter array, and the generated optical signal need not have a rectangular shape. In this illustration, each of the individual LEDs in the array can be switched within the bandwidth limitation of the LED, while providing a composite OEPPM signal having a desired symbol rate.

Figure 12:
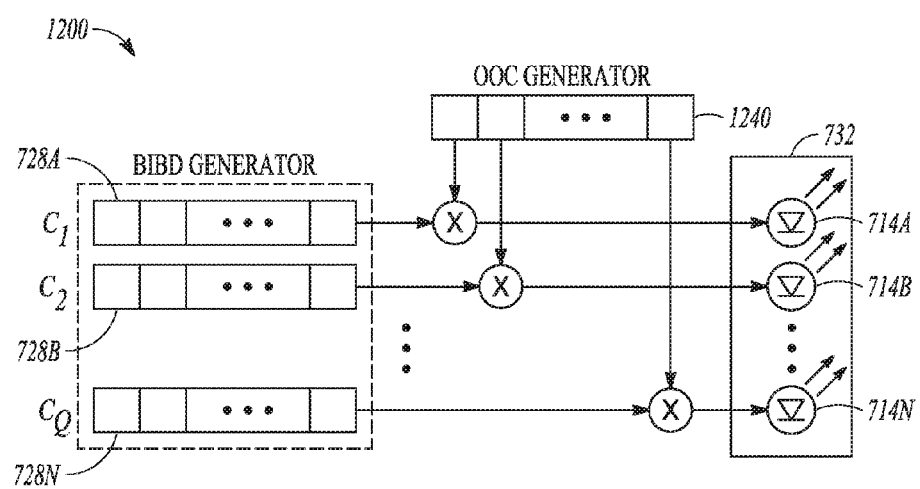
FIG. 12 illustrates generally an illustrative example of at least a portion of a transmitter architecture that can be used to generate and transmit a coded-MEPPM symbol.

The present inventors have also realized that various techniques can include using MEPPM in order to one or more of provide multiple access for different users in an indoor VLC network, or M-ary transmission for each user or device so that a higher data rate can be achieved. FIG. 12 illustrates generally an illustrative example of at least a portion of a transmitter architecture 1200 that can be used to generate and transmit a coded-MEPPM symbol (or in an example, a structure similar to FIG. 7B can be used). In the example of FIG. 12, an OOC generator 1240 can include a shift register to provide OOC codewords to be applied to BIBD codes provided by an array of shift registers 728A, 728B, through 728N. Outputs including combined OOC-BIBD symbols can be provided to a wireless transmitter, such as LED array 732 for optical transmission, similar to other examples described herein. For example, each combined OOC-BIBD output can be used to provide a signal to drive LEDS 714A, 714B, . . . 714N respectively.

A first example of a networking technique using MEPPM can be referred to as a coded-MEPPM (C-MEPPM) technique. Optically-orthogonal codes (OOCs) can be combined with MEPPM to provide multi access and high data-rate for each user or device. Unlike optical Code Division Multiple Access (OCDMA) systems, OOC codewords are instead implemented in the code domain, and can be applied on the codewords of a BIBD code in code-space. For example, $d_n=[d_{n1}, d_{n2}, \ldots d_{nL}]$, $n=1, 2, \ldots, N$, $d_{n1} \in \{0,1\}$ can represent an nth codeword of an OOC having a length L, a weight w, a cross-correlation $\alpha$, and N codewords. By assigning the nth OOC codeword to a user or device n, a transmitted signal for the mth symbol in the M-ary constellation can be represented by $$u_{m,n} = \frac{1}{N_{max}w} \sum_{l=1}^{L} d_{nl} c_l^{(m)} \qquad \text{(EQN. 3)}$$

where the notation $x^{(m)}$ can represent an mth cyclic shift of a vector x. In this manner, the symbols of user or device n are cyclic shifts. A factor $$\frac{1}{Nw}$$

in EQN. 3 can be used to establish a PAPR of Q/K for an LED array as an optical transmitter source.

Figure 13A:
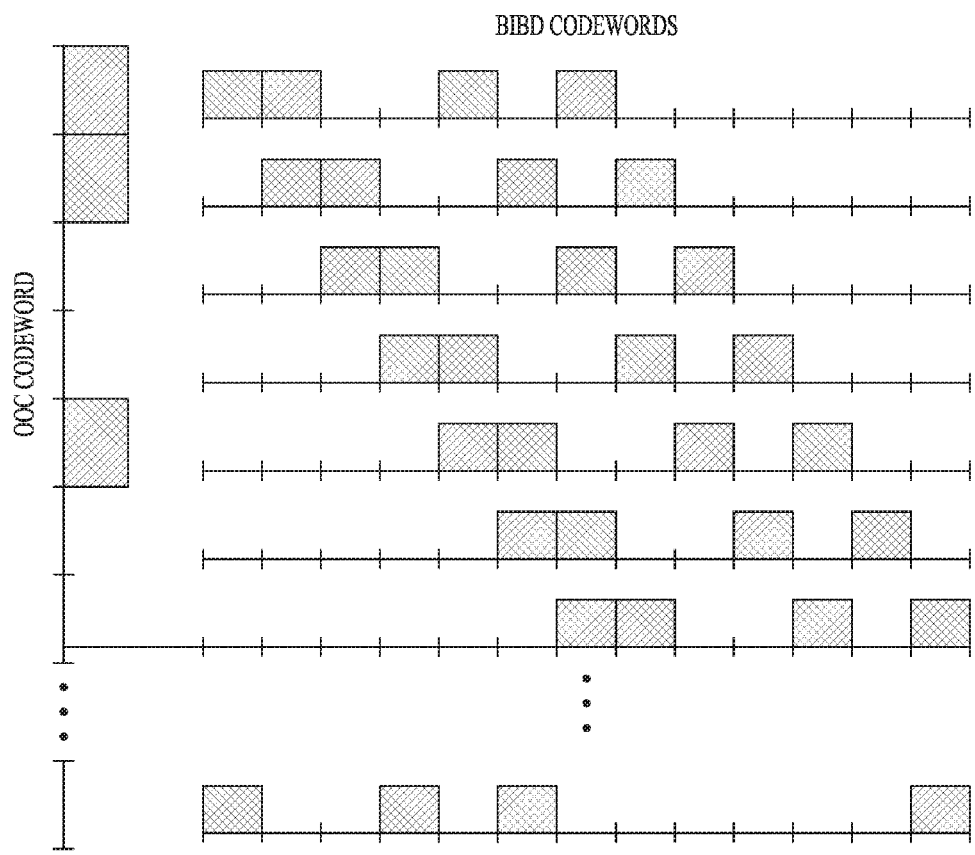
FIGS. 13A and 13B illustrate generally an illustrative example of a technique to generate a code-MEPPM symbol in FIG. 13A, and a resulting symbol in FIG. 13B, such as can be transmitted using the architecture of FIG. 12.
Figure 13B:

FIGS. 13A and 13B illustrate generally an illustrative example of a technique to generate a code-MEPPM symbol in FIG. 13A, and a resulting symbol in FIG. 13B, such as can be transmitted using the architecture of FIG. 12. The generated multilevel symbol using the (1100100000000) OOC codeword is shown in FIG. 13B, and a (13,4,1) BIBD code with $c_1$=(1100101000000) is shown in FIG. 13A, cyclically shifted corresponding to each position in the OOC codeword.

Figure 14A:
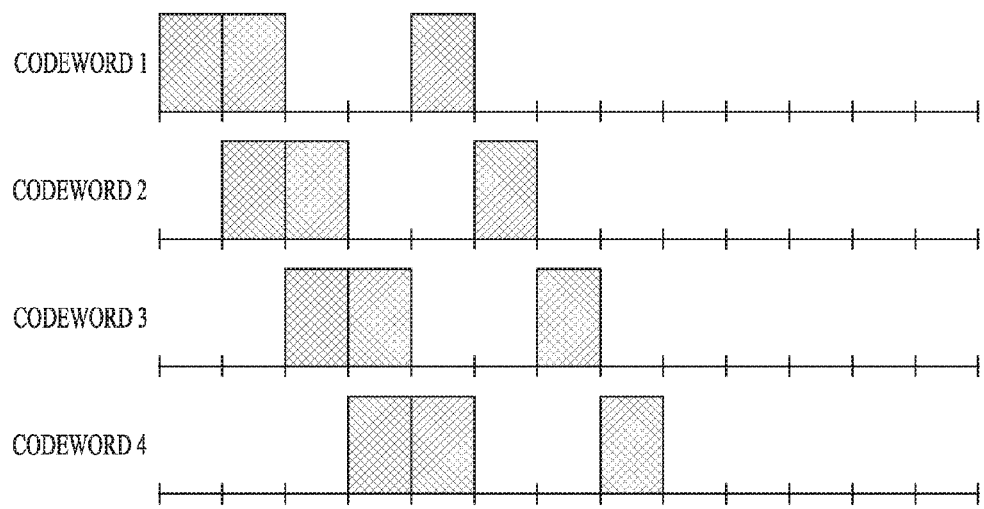
FIG. 14A illustrates generally an illustrative example of the first four symbols for a first user or device for an CCM-OCDMA scheme, using a (1100100000000) OOC codeword.
Figure 14B:
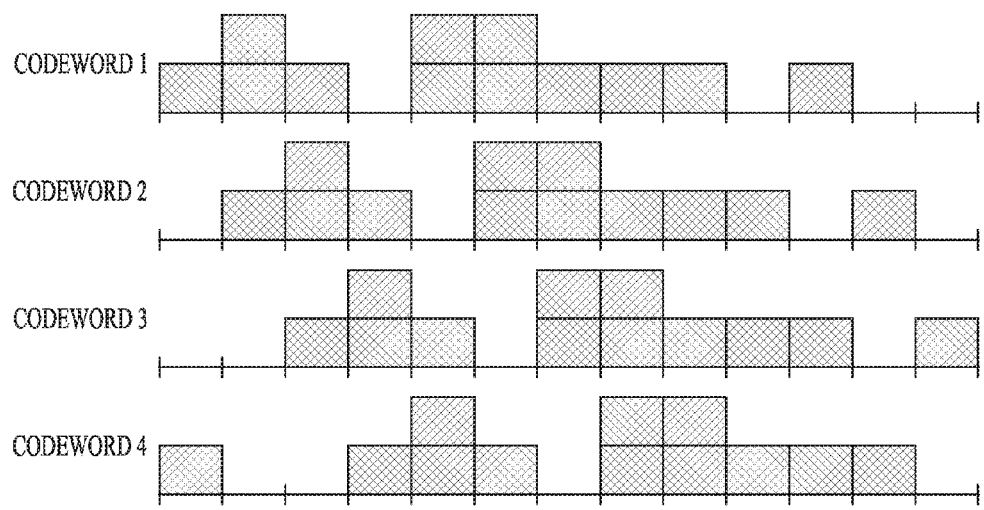
FIG. 14B illustrates generally an illustrative example of the first four symbols for a first user or device for a coded-MEPPM scheme using a (1100100000000) OOC codeword and a (13,4,1)-BIBD code.

FIG. 14A illustrates generally an illustrative example of the first four symbols for a first user or device for a CCM-OCDMA scheme, using a (1100100000000) OOC codeword and FIG. 14B illustrates generally an illustrative example of the first four symbols for a first user or device for a coded-MEPPM scheme using a (1100100000000) OOC codeword and a (13, 4, 1)-BIBD code, the coded MEPPM generated as shown in FIG. 13B. In the example of FIG. 14B, a dimming level can be controlled by changing the BIBD code, and a maximum number of users or devices can be controlled by switching the OOC code.

Figure 15:
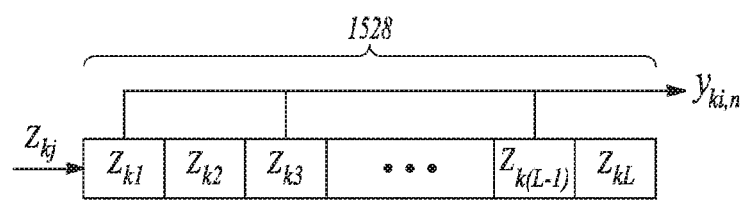
FIG. 15 illustrates generally an illustrative example of an OOC decoder that can be implemented using a shift register.
Figure 16:
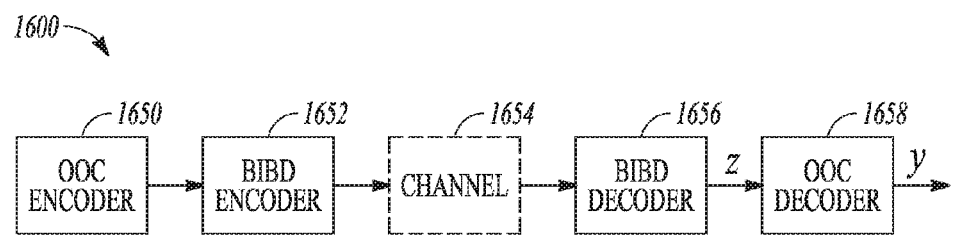
FIG. 16 illustrates generally an illustrative example of a communication system that can be used to implement a coded-MEPPM scheme, such as can include using an OOC code.

FIG. 15 illustrates generally an illustrative example of an OOC decoder that can be implemented using a shift register. An output of a correlation decoder resembles the received signal of a CCM-OCDMA system using OOC. A correlation decoder using a shift-register 1528 can be used to decode the OOC code, such as included as a portion of a system as shown in FIG. 16, which illustrates generally an illustrative example of a communication system 1600 that can be used to implement a coded-MEPPM scheme, such as can include using an OOC code. The system 1600 can include an OOC encoder 1650, a BIBD encoder 1652, a BIBD decoder 1656, and an OOC decoder 1658. The channel 1654 can include a dispersive channel as encountered in an indoor VLC environment as described in other examples herein.

In another example of a networking technique, a generating BIBD code can be divided into several smaller codes, and a different set of codes can be assigned to respective users or devices. Such a technique can be referred to as a divided-MEPPM (D-MEPPM) scheme. Similar to the MEPPM scheme, each user or device can use its assigned codeword set to generate multilevel symbols. For example, $q_n$ can represent a number of BIBD codewords that are assigned to user n, such that $q_1+q_2+\ldots q_N=Q$, and $C_n$, $|C_n|=q_n$ can represent a set of codewords that are assigned to user n, such that $C_n \cap C_m=0$ for any $n \neq m$, and $C_1 \cup C_2 \cup \ldots \cup C_N=\{c_1, c_2, \ldots, c_q\}$. Such a technique can provide a sort of code division multiple access, where distinct codeword sets with cross-correlation $\lambda$ are assigned to respective users or devices. Using this technique, a user or device n can use an $l_n$-branch MEPPM, $1 \leq l_n \leq q_n$, for M-ary transmission using $C_n$. Such a scheme can use either MEPPM type-I or type-II as described and shown above, such as to provide a constellation of size $$\binom{q_n}{l_n}$$

for type-I and $$\binom{q_n+l_n}{l_n}$$

for type-II MEPPM.

Figure 17A:
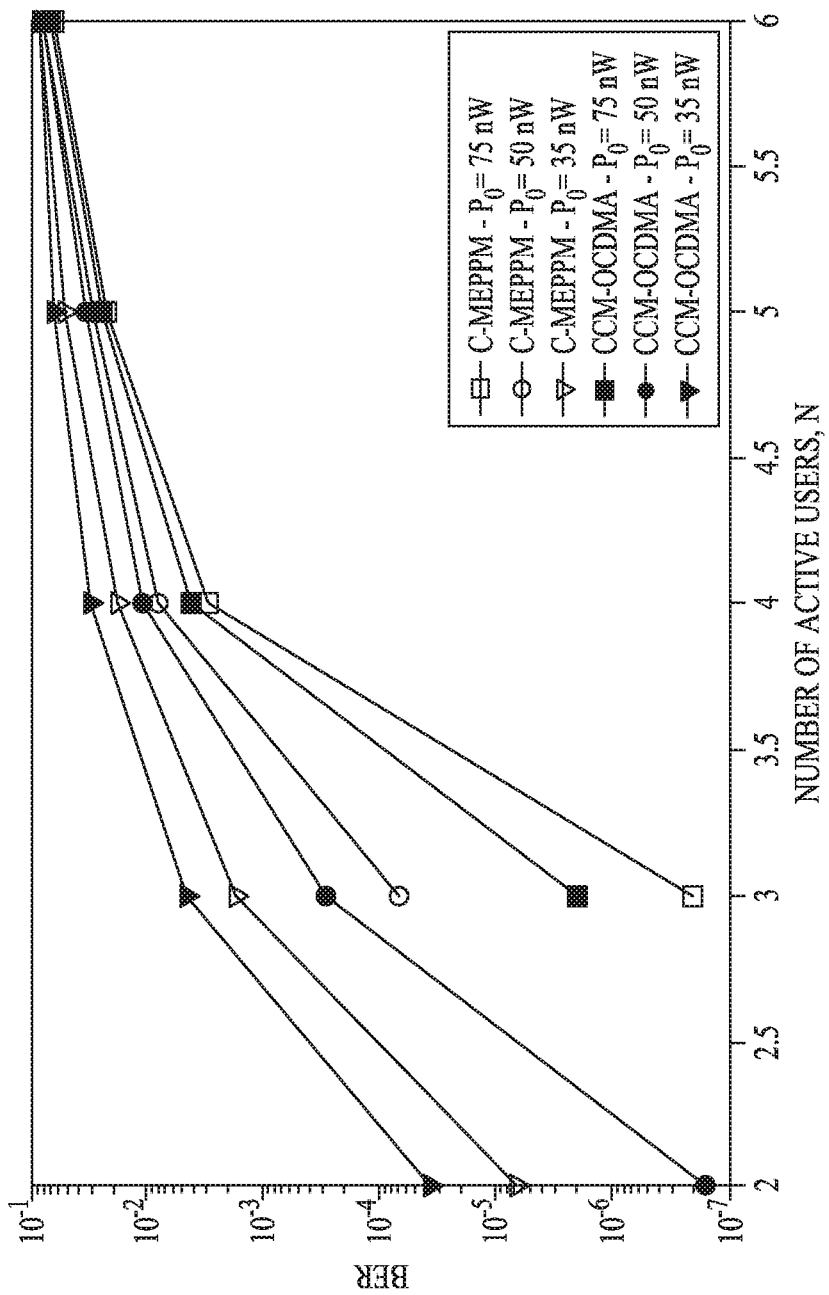
FIG. 17A illustrates generally an illustrative example of simulation results showing a comparison between the performance of C-MEPPM and CCM-OCDMA for different peak received power levels and different number of active users.
Figure 17B:
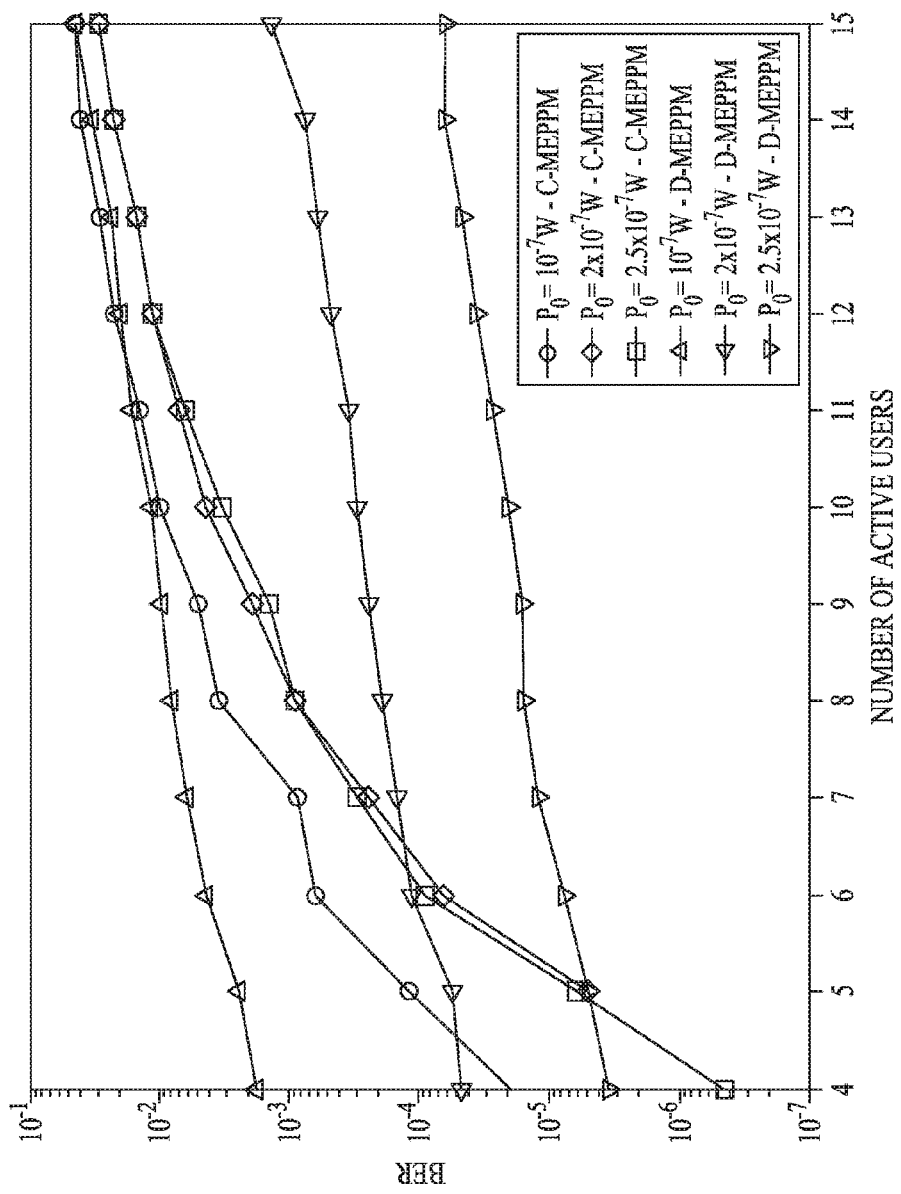
FIG. 17B illustrates generally an illustrative example of simulation results showing BERs versus the number of active interfering users for coded-MEPPM (C-MEPPM) and divided-MEPPM (D-MEPPM).
Figure 17C:
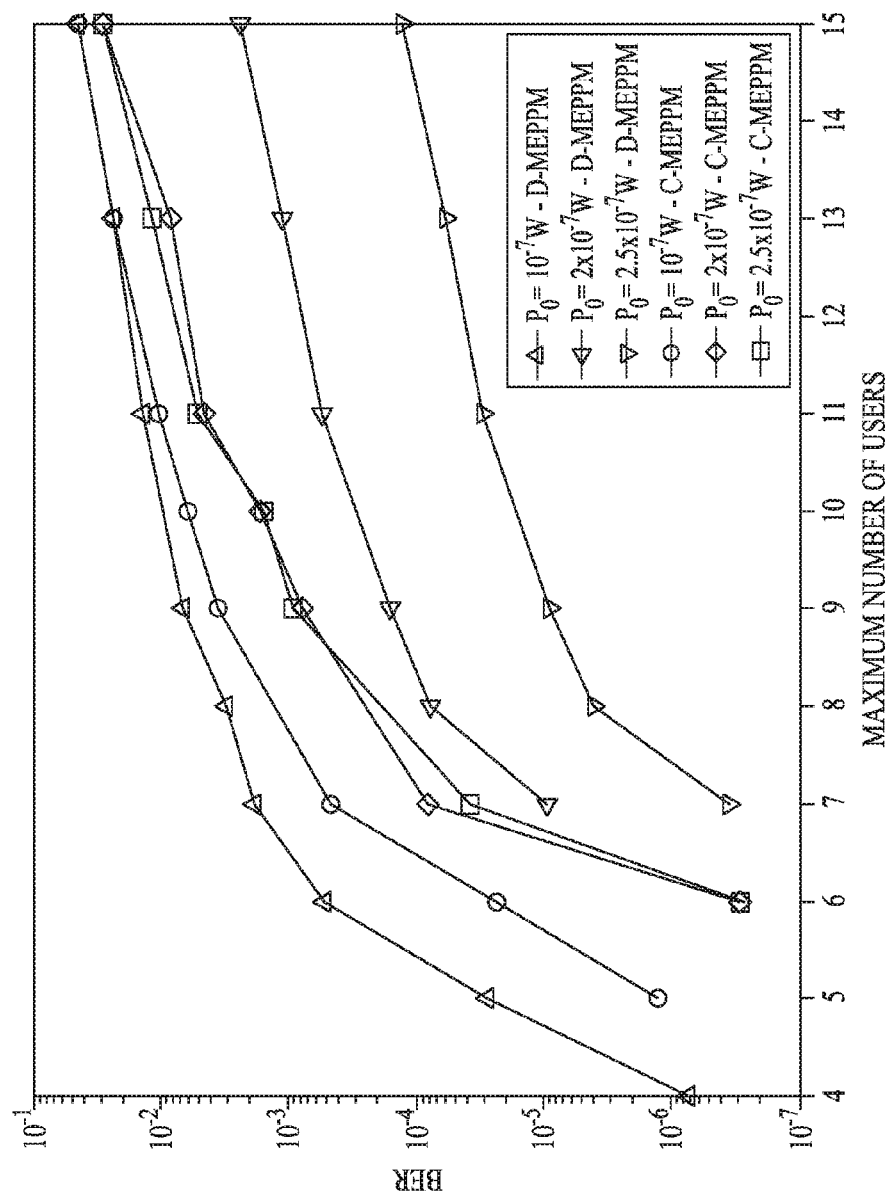
FIG. 17C illustrates generally an illustrative example showing BERs versus the number of active interfering users for coded-MEPPM and divided-MEPPM with different peak power levels.

Numerical results using Monte-Carlo simulation are included in the illustrative examples of FIGS. 17A, 17B, and 17C, such as to show a comparison between the described networking techniques, and to show their performance relative to a CCM-OCDMA technique.

FIG. 17A illustrates generally an illustrative example of simulation results showing a comparison between the performance of C-MEPPM and CCM-OCDMA for different peak received power levels and different number of active users. In FIG. 17A, a simulated BER of CCM-OCDMA can be compared to a coded-MEPPM scheme using a (341,85, 21)-BIBD for different numbers of active users. In this illustrative example, a (341,5,1)-OOC is used to encode the data in both systems. The symbols of the coded-MEPPM have larger Euclidean distance than the symbols of CCM-OCDMA, and hence, the coded-MEPPM achieves lower BER compared to CCM-OCDMA according to the simulation of FIG. 17A. While the BIBD code that is used in this illustrative example has a PAPR of 4, other BIBD codes can be used to provide different PAPRs. Some illustrative examples include (347,173,86) with a PAPR of 2, (364,121, 40) with a PAPR of 3, and (381,20,1) with a PAPR of 19.

FIG. 17B illustrates generally an illustrative example of simulation results showing BERs versus the number of active interfering users for coded-MEPPM (C-MEPPM) and divided-MEPPM (D-MEPPM). In FIG. 17B, a comparison between the performance of the coded-MEPPM using a (63,31,15)-BIBD and a (63,9,2)-OOC, and divided-MEPPM using the same BIBD code is shown. In FIG. 17B, the BER is plotted versus the number of active interfering users or devices for three different peak received power levels. For this illustrative example the coded-MEPPM includes a (63, 31,15)-BIBD code to construct the symbols, and a (63,9,2)-OOC is used to encode the users' data. For this illustrative example, each user is assigned 67 symbols, and the maximum number of users is 16. A Euclidean distance between two symbols of a user can be $\Lambda_0\sqrt{340/67}$. In divided-MEPPM, distinct sets of 4 BIBD codewords can be assigned to users, and therefore, the maximum number of users is again 16. For such an illustrative example, each user utilizes type-II MEPPM and can be assigned 70 symbols. The minimum Euclidean distance between two symbols in such an example can be $\Lambda_0\sqrt{34/67}$.

Without being bound by theory, the results shown in FIG. 17B indicate that for weak peak powers the error probability of coded-MEPPM is generally lower than divided-MEPPM because coded-MEPPM has larger distance between its symbols and its performance is generally limited by multiple access interference (MAI), while the performance of divided-MEPPM is generally limited by shot noise.

FIG. 17C illustrates generally an illustrative example showing BERs versus the number of active interfering users for coded-MEPPM and divided-MEPPM with different peak power levels. In FIG. 17C, a BER of the coded-MEPPM and divided-MEPPM versus the maximum number of users for three different peak power levels is shown. For coded-MEPPM results in this illustrative example, different OOC codes are used and can provide various maximum numbers of users or devices. Similarly, for divided-MEPPM, a size of the subsets of BIBD codewords can be selected so that throughput for each point on the curve is enhanced or maximized. The parameters can be selected such that a number of symbols for all cases is approximately the same. Without being bound by theory, according to the simulation results of FIG. 17C, coded-MEPPM performs better than divided-MEPPM only for low received peak power cases. For strong received power levels, the results of FIG. 17C generally indicate that the divided-MEPPM has a lower BER compared to coded-MEPPM. Other techniques can be used to select assigned symbols, such as using spatial information about a location of an optical transmitter or user with respect to other transmitters.

Figure 18A:
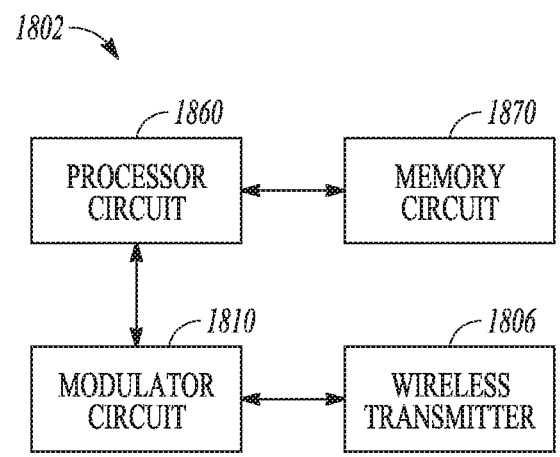
FIGS. 18A and 18B illustrate generally examples of at least portions of a system that can include at least one processor circuit and at least one memory circuit.
Figure 18B:
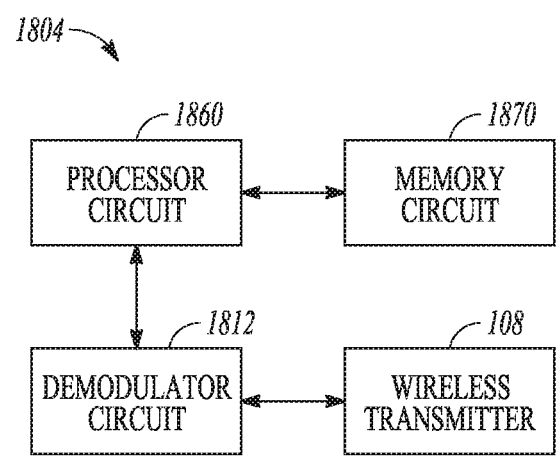

FIGS. 18A and 18B illustrate generally examples of at least portions of a system that can include at least one processor circuit and at least one memory circuit. For example, FIG. 18A illustrates generally a transmitter 1802 that can include a modulator circuit 1810 coupled to a wireless transmitter 1806. FIG. 18B illustrates generally a receiver 1804 that can include a demodulator circuit 1812 coupled to a wireless receiver 1808. The transmitter 1802 and the receiver 1804 can be included as a portion of a single assembly, such as to provide a transceiver, such as having modulator and demodulator circuits 1812 and 1810 coupled to a shared processor circuit 1860. In an example, the transceiver need not use the same communication medium for receiving and transmitting (e.g., a transceiver could include an optical receiver and a radio transmitter or vice versa).

One or more of the transmitter 1802 or the receiver 1804 can include one or more processor circuits such as a processor circuit 1860, such as coupled to one or more memory circuits such as a memory circuit 1870. The apparatus and techniques described elsewhere herein can be implemented in part using the processor circuit 1860, such as including a processor circuit 1860 configured to perform instructions stored using the memory circuit 1870. The modulator circuit 1810 and demodulator circuit 1812 can include one or more analog or digital blocks.

While the term processor circuit is used, such a processor circuit or other portions of the examples of FIGS. 18A and 18B (and other examples) can be implemented using one or more of a digital signal processor (DSP), an application specific integrated circuit (ASIC), a programmable logic device (PLD) such as a Field Programmable Gate Array (FPGA), a microcontroller, a system-on-a-chip or other circuitry. The memory circuit 1870 can include one or more of a dynamic random access memory (DRAM), a static random access memory (SRAM), or one or more non-volatile memories such as a masked read-only memory (ROM), a FLASH memory, an erasable-programmable read-only memory (EPROM), or other storage medium. In an example, one or more modulation, encoding, decoding, demodulation, interleaving, de-interleaving, or other signal processing or conditioning steps can be performed digitally, such as using the processor circuit 1860 or using a digital portion of the modulator circuit 1810 or demodulator circuit 1812.

In an example, one or more of FIG. 18A or 18B, or other circuitry shown and described herein can be included as a portion of an assembly, such as an interface card, dongle, or other assembly that can be installed or removed from other equipment in a modular manner, such as by an end user. In another example, one or more of a transmitter or receiver as shown and described herein can be included as a portion of a lighting device such as a bulb, a light fixture (e.g., a luminaire or troffer), or other assembly.

Various Notes & Examples

Each of the non-limiting examples shown and described in this document can stand on its own, or can be combined in various permutations or combinations with one or more of the other examples.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic disks, removable optical disks (e.g., compact disks and digital video disks), magnetic cassettes, memory cards or sticks, random access memories (RAMs), read only memories (ROMs), and the like.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. §1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The claimed invention is:

1. A system comprising:
   a digital modulator circuit configured to provide digitally encoded information using a pulse-position modulation (PPM) encoding scheme, the pulse-position modulation encoding scheme including modulated information comprising a linear combination of expurgated PPM (EPPM) symbols, the EPPM symbols selected from a constellation including (1) a cyclic series of symbols or (2) a combination of the cyclic series of symbols and logical complements of the cyclic series of symbols; and
   a wireless transmitter configured to receive the digitally encoded information from the digital modulator circuit and configured to wirelessly transmit the modulated information by varying an amplitude of an output signal.

2. The system of claim 1, wherein the wireless transmitter comprises an optical transmitter including an optical source; and
   wherein the wireless transmitter is configured to optically transmit the modulated information by varying an intensity of light output by the optical source.

3. The system of claim 1, wherein the linear combination of EPPM symbols is established using an adder coupled to respective shift registers.

4. The system of claim 1, wherein the wireless transmitter comprises an array of respective sources; and
   wherein the linear combination of EPPM symbols is established by spatially compounding the outputs of the respective sources, the respective sources coupled to respective shift registers.

5. The system of claim 1, comprising an interleaver configured to provide an interleaved representation of the modulated information to the wireless transmitter for wireless transmission.

6. The system of claim 5, wherein the interleaver is configured to rearrange a sequence of EPPM symbols included in the modulated information to be transmitted.

7. The system of claim 5, wherein the interleaver is configured to recode the modulated information including maintaining a peak-to-average power ratio (PAPR) of the information before and after recoding.

8. The system of claim 1, wherein the wireless transmitter comprises an optical source used at least in part for providing visible optical energy for illumination; and
   wherein the cyclic series of symbols is selected at least in part according to a specified dimming level of the optical source.

9. The system of claim 1, wherein the modulated information includes a subset of EPPM symbols corresponding to a targeted user or device.

10. The system of claim 9, wherein the modulated information includes respective subsets of EPPM symbols selected corresponding to target users or devices to provide multi-user or multi-device concurrent wireless transmission of the modulated information.

11. The system of claim 1, wherein the modulated information includes symbols corresponding to a targeted user or device, the symbols established using an optically-orthogonal code (OOC).

12. A system comprising:
    a wireless receiver configured to wirelessly receive modulated information, the information modulated using a variation in amplitude of a wireless-transmitted signal; and
    a digital demodulator circuit configured to demodulate the received modulated information, the information modulated using a pulse-position modulation (PPM) encoding scheme to provide a linear combination of expurgated PPM (EPPM) symbols, the EPPM symbols selected from a constellation including (1) a cyclic series of symbols or (2) a combination of the cyclic series of symbols and logical complements of the cyclic series of symbols.

13. The system of claim 12, wherein the wireless receiver comprises an optical receiver including an optical-to-electric transducer.

14. The system of claim 12, comprising a de-interleaver configured to provide a de-interleaved representation of the modulated information from the wireless receiver.

15. The system of claim 14, wherein the de-interleaver is configured to rearrange a sequence of EPPM symbols included in the modulated information to be demodulated.

16. The system of claim 12, wherein the modulated information includes a subset of EPPM symbols corresponding to a targeted user or device.

17. The system of claim 16, wherein the modulated information includes respective subsets of EPPM symbols selected corresponding to target users or devices to provide multi-user or multi-device concurrent wireless transmission of the modulated information.

18. The system of claim 16, wherein the modulated information includes symbols corresponding to a targeted user or device, the symbols established using an optically-orthogonal code (OOC).

19. A system, comprising:
    a digital modulator circuit configured to provide digitally encoded information using a pulse-position modulation (PPM) encoding scheme, the pulse-position modulation encoding scheme including modulated information comprising a linear combination of expurgated PPM (EPPM) symbols, the EPPM symbols selected from a constellation including (1) a cyclic series of symbols or (2) a combination of the cyclic series of symbols and logical complements of the cyclic series of symbols;

a wireless transmitter configured to receive the digitally encoded information from the digital modulator circuit and configured to wirelessly transmit the modulated information by varying an amplitude of an output signal;

a first wireless receiver configured to wirelessly receive the modulated information; and a first digital demodulator circuit configured to demodulate the received modulated information.

20. The system of claim 19, comprising an interleaver configured to provide an interleaved representation of the modulated information to the wireless transmitter for wireless transmission using the wireless transmitter; and a de-interleaver configured to provide a de-interleaved representation of the modulated information from the wireless receiver.

21. The system of claim 19, comprising a second wireless receiver and a second digital demodulator circuit; and wherein the first wireless receiver and the first digital demodulator circuit correspond to a first user or a first device;

wherein the second wireless receiver and the second digital demodulator circuit correspond to a second user or a second device; and wherein the modulated information includes symbols corresponding to a targeted user or device.

22. The system of claim 19, wherein the wireless transmitter comprises an optical transmitter including an optical source;

wherein the wireless transmitter is configured to optically transmit the modulated information by varying an intensity of light provided by the optical source;

wherein the first wireless receiver comprises an optical receiver including an optical-to-electric transducer.

* * * * *